July 5, 1955 W. G. ABBOTT, JR 2,712,489
METHOD OF FORMING STAPLE-LENGTH FIBERS BY EXTRUSION
Filed Sept. 29, 1948 2 Sheets-Sheet 1
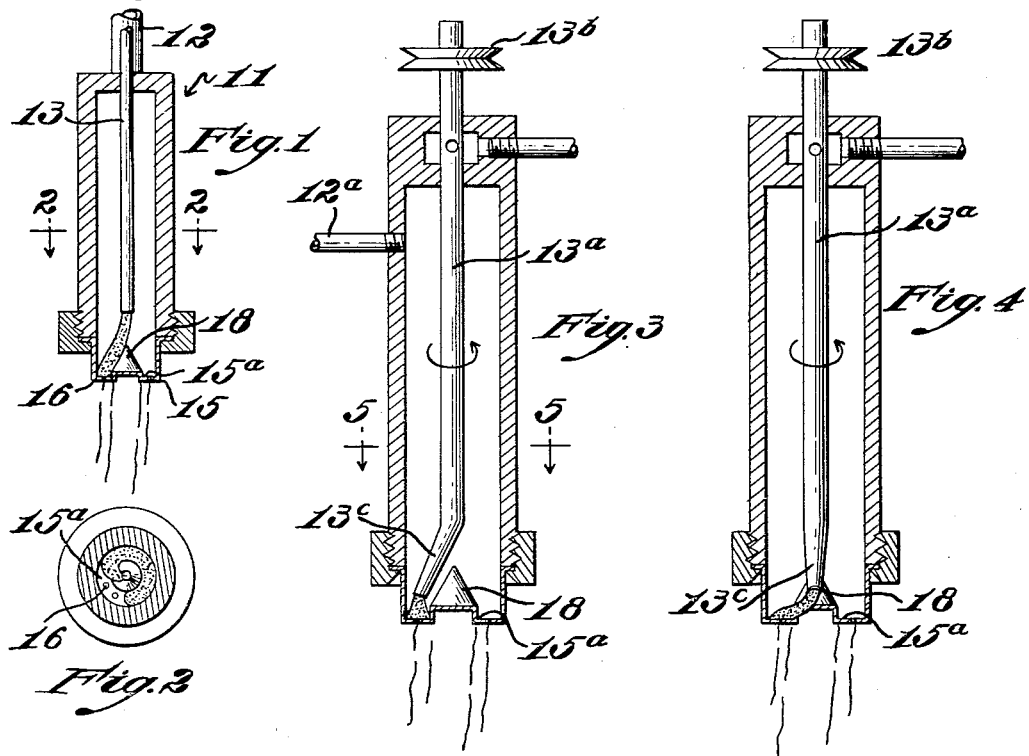
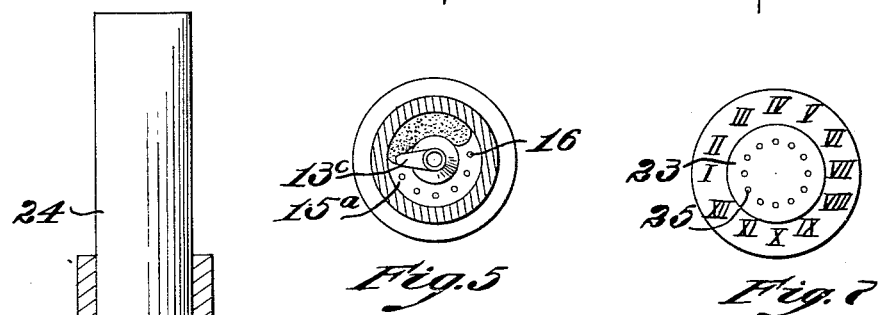
Inventor
William G. Abbott Jr.
by Roberts, Cushman & Grover
Atty's July 5, 1955 W. G. ABBOTT, JR 2,712,489
METHOD OF FORMING STAPLE-LENGTH FIBERS BY EXTRUSION
Filed Sept. 29, 1948 2 Sheets-Sheet 2
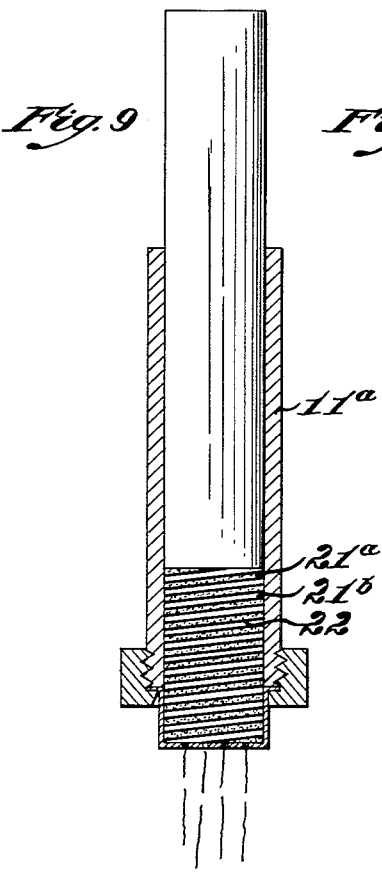
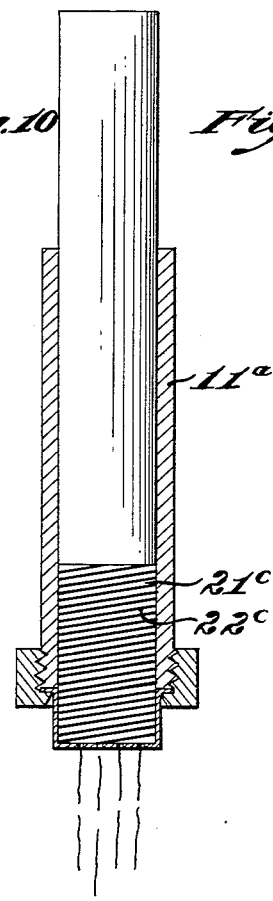
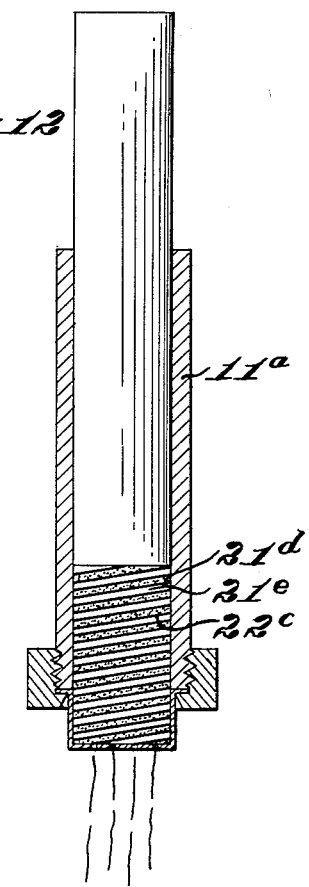
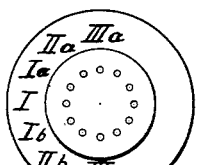
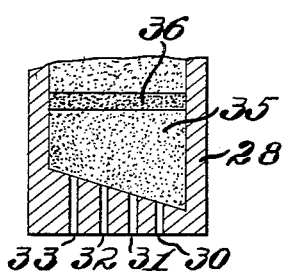
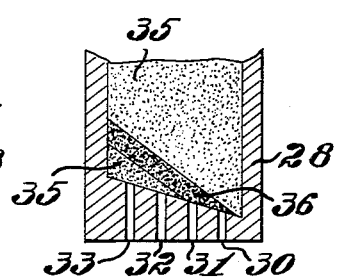
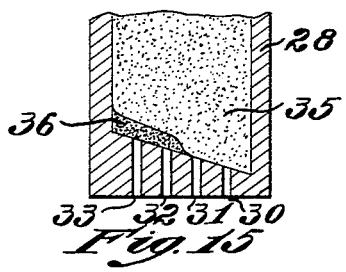
Inventor
William G. Abbott Jr.
by Roberts, Cushman & Grover
Attys United States Patent Office 2,712,489
Patented July 5, 1955

2,712,489
METHOD OF FORMING STAPLE-LENGTH FIBERS BY EXTRUSION

William G. Abbott, Jr., Wilton, N. H.

Application September 29, 1948, Serial No. 51,787

11 Claims. (Cl. 18—54)

This application is a continuation-in-part of my application Serial No. 666,173, filed April 30, 1946, now abandoned.

This invention relates to processes involving the extrusion of a plurality of materials through a nozzle, one at least of such materials being a filament-forming material, and more particularly relates to starting and stopping of flow of the respective materials through the plurality of orifices of an extrusion nozzle in a systematic and sequential manner in the production of artificial fibers of staple length.

It has previously been proposed in British Patent No. 435,384 and United States Patent No. 1,856,071 to force a column of filament-forming material through an extrusion nozzle and to subdivide the column of filament-forming material at regular intervals by interposing a body of non-filament forming material such as water or gas, with the result of extruding the filaments in spaced groups. The groups of filaments may thus have a length comparable to the staple length of cotton or cut rayon, and a body of these filaments then requires to be subjected to conventional treatment to arrange them in sufficiently orderly overlapped relation so that they may be spun into yarn.

My application Serial No. 506,664, filed October 18, 1943, patented as No. 2,399,191, April 30, 1946, describes the feeding to the plurality of orifices of an extrusion nozzle of a composite of filament-forming material and another, non-filament-forming material, with those materials so disposed that bodies of each are presented to the individual orifices at frequent intervals, the bodies of non-filament-forming material filling the orifice cross section and thereby temporarily excluding the filament-forming material from passage through the orifice. By separating the non-filament-forming material from the filament-forming material after extrusion of the sliver, the resulting sliver comprises overlapped and longitudinally staggered staple length filaments adapted for the spinning process with little, if any, further rearrangement of the staple filaments.

In the practice of the invention of said application Serial No. 506,664 the even distribution of the materials in the composite as they reach the extrusion orifices is important in order to maintain the desired degree of uniformity of the product.

An object of the present invention is to avoid the necessity for evenness of distribution of the different materials in a composite of materials wherein each material interrupts the passage of the other material at frequent intervals through individual extrusion orifices.

A further object of the invention is to permit both such materials in the composite to be of continuous nature as distinguished from smaller separated particles.

A further object of the invention is to provide for sub-dividing one material, which may be of a continuous and homogeneous nature, in the presence of another material, which may also be of a continuous and homogeneous nature, at the entrances to the extrusion orifices.

Although certain features of the present invention are applicable to the extrusion of staple length fibers regardless of the mode of handling and treatment of the extruded fibers, fullest advantages of the invention are obtained when the fibers from the nozzle are gathered into a sliver in which, preferably uniformly distributed, the fibers lie in a longitudinally staggered overlapped relation adapted for spinning of such directly formed sliver.

The present invention is not limited to employment of a composite of which one of the materials is a non-filament-forming material, and one of the advantages of the present invention is that it provides for an expeditious way of employing a composite which comprises a plurality of filament-forming materials and does not contain any non-filament-forming material, or only a very minor proportion of a non-filament-forming material.

Other objects of the invention and features of advantage will be apparent from this application and its drawings in which the invention is explained.

In the drawings in which the extrusion orifices are exaggerated in size for clarity of illustration:

Fig. 1 is a vertical sectional view through an extrusion nozzle showing the practice of one form of the present invention;

Fig. 2 is a horizontal sectional view of the line 2—2 of Fig. 1;

Fig. 3 is a view similar to Fig. 1 showing a generally similar but somewhat modified form of apparatus;

Fig. 4 is a vertical sectional view through the device of Fig. 3 taken at right angles to Fig. 3;

Fig. 5 is a horizontal sectional view taken in the line 5—5 of Fig. 3;

Fig. 6 is a view similar to Fig. 1 showing the practice of another form of the invention, this figure illustrating use of a single filament-forming material;

Fig. 7 is a bottom view of an extrusion nozzle such as used in Fig. 6;

Fig. 8 is a diagrammatic bottom view of the spiral of filament-forming material presented at a given moment to the orifices of the nozzle of Figs. 6 and 7;

Fig. 9 is a view similar to Fig. 6 illustrating the use of two different filament-forming materials;

Fig. 10 is a view similar to Figs. 1 and 6 showing the practice of a further form of the invention, this figure illustrating use of a single filament-forming material;

Fig. 11 is a bottom view of an extrusion nozzle such as used in Fig. 10;

Fig. 12 is a view similar to Fig. 10 illustrating the use of two different filament-forming materials; and Figs 13, 14 and 15 are vertical sectional views showing successive steps in the feeding of another composite of material to another form of extrusion nozzle in a further form of the invention.

In all of the forms of the invention now to be described, artificial staple-length fibers are formed by extruding a filament-forming material through a plurality of extrusion orifices and stopping and starting extrusion through the orifices in a systematic sequence.

The several forms of the invention each operate on the general principle that at least one material of a composite material is presented to a group of extrusion orifices in such relation to the group of orifices as to uncover orifices of the group in sequence or to cover orifices of the group in sequence. Such material, so presented to the group of orifices can be in a substantially homogeneous state, and further, each material of the composite can be in a substantially homogeneous state. Thus necessity for mixing one of the materials into the other material in finely divided particle form is avoided, and sub-division of each of the materials of the composite into portions of appropriate size can take place at the entrances to the extrusion orifices. The sequential uncovering of the orifices by one material and the sequential covering of the orifices by the same or the other material provides for the desired staple length of the extruded fibers of the one or more filament-forming materials contained in the composite, and also provides for a longitudinally overlapped and staggered relation of these extruded fibers. Preferably as in the several illustrated forms of the invention, a surface of one of the materials is caused to approach a group of orifices in relatively inclined relation thereto. In certain illustrated forms of the invention, such inclination follows from the presentation of the material to the orifices in a spiral condition.

Referring to Figs. 1 and 2 the spinneret indicated generally at 11 is provided at its top with an entrance conduit 12 for one of the materials to be extruded, and with an entrance conduit 13, extending centrally down to nearly its bottom, for the other material to be extruded. A cap 15 at the bottom of the spinneret is provided with an annular depressed portion 15ª provided with a considerable number of extrusion orifices 16 arranged in a circle. A conical guide 18 extends upwardly from the central inner portion of the cap 15 to a point close to the open mouth of conduit 13.

The two materials to be extruded are fed continuously through the conduits 12 and 13 under pressure. The material fed through central conduit 13 should be of thick coherent consistency, adapted to emerge as a ribbon or strip and capable of coiling at least to the extent of transiently assuming a partially coiled configuration with the assistance of the central guide 18 and the depressed portion 15ª of the cap. Preferably this material is a filament-forming material of the composite, such for instance as a viscid solution of casein. Emerging from conduit 13, this material is guided by the conical guide 18 into the depressed portion 15ª of the cap and assumes a spiral path and shape as indicated diagrammatically in Figs. 1 and 2. The inclined portion of ribbon or strip of viscid filament-forming material between the conduit 13 and the orifices is progressively caused to approach the depressed portion 15ª of the cap, then lie thereon and be subject to the extruding action of the underlying orifices. The rate of feed of the material from conduit 13 and the rate of its discharge through the orifices 16 are so related that not all of the orifices 16 are covered at any given moment by the spirally led material. Thus the position of the spiral of material from conduit 13, as viewed in Fig. 2, travels progressively around the depressed portion 15ª of the cap, sequentially covering the orifices as it reaches them and sequentially uncovering the orifices as the tail end of the spiral disappears by extrusion through these orifices. One at least, and preferably several, of the orifices are open at any moment to the passage of the other material which has entered the spiral through conduit 12.

This other material which has entered through conduit 12 may also be viewed as sequentially covering the orifices as it reaches them in the wake of the retreating tail end of the spiral of the material discharged through conduit 13, and as sequentially uncovering the orifices as it is displaced by the circumferentially advancing spiral.

When, as indicated above, the material supplied through central conduit 13 is a thick viscid solution of casein, the material supplied through conduit 12 may consist of such fluid as mineral oil.

After extrusion through the orifices, the material is subjected to coagulation and/or hardening action appropriate to the filament-forming material or materials employed. For instance, in employing a single filament-forming material consisting of casein solution, and a non-filament-forming material consisting of mineral oil, the extruded fibers may be carried through a coagulating and hardening bath in the general manner described in my said Patent No. 2,399,191, and the mineral oil, which is non-coagulable, may be separated from the coagulated fibers. Such bath, may for example comprise a solution of formaldehyde and water, to which there may be added acetic acid, glucose or calcium chloride to assist in the coagulation and hardening.

If desired, instead of supplying a single filament-forming material through the central conduit 13, a mixture of two or more different filament-forming materials can be supplied through this conduit, in which case the coagulating and hardening bath should be such as to coagulate and harden the several components of filament-forming material.

Instead of supplying inert material through the conduit 12, a second filament-forming material may be supplied through this conduit and each filament-forming material serve to interrupt passage of the other filament-forming material through each orifice, according to the general principle described in my copending application Serial No. 666,172, filed April 30, 1946, now Pat. No. 2,473,499. Thus when a viscose solution is supplied through the central conduit, a spinnable partly coagulated casein solution may be supplied through the other conduit 12.

This partly coagulated casein solution may be prepared as follows. A small amount of casein in water is added to a dilute precipitant such as formaldehyde while being actively agitated. A small amount of the resulting thin milky solution is added to a usual spinnable casein solution, with the result of somewhat thickening it and rendering it less soluble without causing granulation or other change that would interfere with its spinning properties. The resulting partly coagulated casein solution will not mix with the viscose solution even after standing a considerable time.

For use with filament-forming solutions that are too thin in consistency or not sufficiently coherent to coil in the manner described above, for example a thin casein solution, the modified device of Figs. 3 and 4 may be employed. As shown in these figures the central conduit 13ª is rotatably mounted in the spinneret, is provided with means for rotating it, such as illustrated by the pulley 13ᵇ, and at its bottom with a portion 13ᶜ adapted to carry its filament-forming solution to the region above the depressed annular portion 15ª without contact of this solution with the surface of the cone 18. Then, as in Figs. 1 and 2, the location of the filament-forming material in the annular depressed portion 15ª, indicated in Fig. 5, progressively travels around this portion, covering and uncovering the orifices and being extruded therethrough.

The other material to be passed through the orifices, for example an inert interrupting material such as mineral oil or air, may be supplied to the spinneret through conduit 12ª (Fig. 3) under constant pressure.

The form of procedure and device of Figs. 3, 4 and 5 is useful in cases in which it is desired to shorten the time in which the materials supplied by the two conduits are in contact before extrusion. For instance two filament-forming solutions, supplied by the conduits 13ª and 12ª respectively, may be such as would eventually lose their respective identities upon continued contact with each other. In this case, the relatively short time of contact of the two materials in Figs. 3, 4 and 5 permits extrusion of the two materials without such loss of identity. Thus the form of invention of Figs. 3, 4 and 5 is of assistance in facilitating the use of the general principle described in my said copending application Serial No. 666,172, now Pat. No. 2,473,499, employing two filament-forming materials to interrupt the passage of each other through the orifices. In such use of the procedure and device of Figs. 3, 4 and 5 the respective solutions may be viscose solution and casein solution, each in the usual spinnable condition, or with the casein solution partly coagulated as described above.

Again, in employing a coagulating solution as the interrupting agent to interrupt flow of the filament-forming material through the orifices, the form of invention illustrated in Figs. 3, 4 and 5 is of advantage in reducing the period of contact of coagulating solution and filament-forming material before extrusion. In this use of the invention the filament-forming material may for example be casein solution or viscose solution and the coagulating agent may be a dilute sulphuric acid solution.

Figs. 6, 7 and 8 illustrate an embodiment of the invention in which the materials to be extruded are preformed into spiral configuration before insertion into the spinneret. Thus the preformed composite indicated generally at 20 preferably consists predominantly of a filament-forming material 21 formed into a spiral of relatively low pitch, each convolution of which is separated from adjacent convolutions by a thin spiral parting layer 22 of a relatively inert non-filament-forming material adapted to prevent coalescence, fusion or blending of adjacent convolutions of the filament-forming material.

The form of the invention shown in Figs. 6, 7 and 8 is especially adapted for plastic solid or semi-solid material. In the event that the filament-forming material 21 consists of plastic viscose or casein, the inert parting layer 22 may for example consist of a dry powder such as talc dusted in between the convolutions of the filament-forming material, or a liquid paraffin oil or a melted paraffin wax applied between the convolutions of the filament-forming material. In the event that the filament-forming material consists of such a substance as Vinyon, Saran or nylon maintained in plastic condition by solvent action or heat or both, melted wax is recommended as the material of the parting layer 22.

The composite 20 is forced under pressure by a plunger 24 through a suitable enclosing tubular conduit 11ª to an extrusion cap or plate 23, Figs. 6 and 7, having a plurality of extrusion orifices 25 which are arranged in a circle. As the composite is forced downwardly by the force of the plunger 24, and its material is extruded through the several orifices simultaneously, each portion of the spirally disposed material 21 is presented in relatively inclined relation to the group of orifices and will cover the orifices sequentially and also uncover the orifices sequentially as extrusion of the composite 20 proceeds. Similarly the material 22 of the parting layer covers and uncovers the orifices sequentially, momentarily shutting off the flow of filament-forming material through individual orifices. As a consequence each orifice extrudes a portion of filament-forming material adapted to form a staple-length filament, followed by a portion of the non-filament-forming material, and each material at any given moment is being extruded by at least one and preferably several of the orifices, with resultant staggering longitudinally of the pieces of staple-length extruded filament-forming material.

With a spiral having convolutions of right-hand pitch as illustrated in Fig. 6, the discharge of the filament-forming material through the orifices 25 will follow sequentially the order I, II, III, etc., as indicated in Fig. 7, the bottom edge portion 26 of the spiral (Fig. 8) following the same course.

In a manner similar to that described in connection with Figs. 6 to 8, a plurality of different bodies of filament-forming material of different kinds can be extruded. Thus in Fig. 9 the composite 20 is shown as comprising a spiral body 21ª of one filament-forming material such for instance as plastic viscose or plastic casein, and a spiral body 21ᵇ of another filament-forming material such for example as plastic Vinyon or plastic Saran, the convolutions of each spiral lying between convolutions of the other spiral but being separated therefrom by a parting layer 22 which may comprise a thin layer of wax adapted to prevent coalescence, fusion or blending of the adjacent convolutions of the two filament-forming materials. In this embodiment of the invention the staple-length fibers of extruded filament-forming materials are not only staggered lengthwise, but also comprise a systematic mixture of different kinds of fibers.

While the spiral which emerges from the conduit 13 of Figs. 1 and 2, or the conduit 13ª of Figs. 3 to 5, or the preformed spirals of Figs. 6 to 9 may be of great length, so as to be continuous throughout relatively long runs, it will be apparent that for certain uses the spirally disposed filament-forming material may be interrupted, as by the occurrence in the spiral of an interrupting body of non-filament-forming material, and the generally spirally disposed filament-forming material still operate to cover and uncover the orifices sequentially.

It will be observed that in Figs. 6 to 9, relatively thin layers of filament-forming material are presented to the group of orifices in a relatively inclined relation thereto by virtue of the fact that the material is in the form of a spiral. A similar presentation of the material to the orifices, and a generally similar interrupting action at the orifices can be secured by disposing the materials of the composite in distinct layers which bear a relatively inclined relation to the extrusion orifices.

Fig. 10 shows distinct layers 21ᶜ of filament-forming material which may be the material referred to in connection with Figs. 6 to 8, and distinct parting layers 22ᶜ which may be of the inert separating material of Figs. 6 to 9, each such layer extending transversely across the spinneret and bearing an inclined relation to the group of extrusion orifices at the bottom of the spinneret.

Fig. 12 shows a composite consisting for example of two different filament-forming materials 21ᵈ and 21ᵉ which may consist respectively of the filament-forming materials of the two spiral bodies 21ª and 21ᵇ of Fig. 9, separated by suitable thin parting layers 22ᶜ of wax.

In each of the embodiments of Figs. 10 and 12, the progress of each layer of material across the orifices at the bottom of the spinneret, and the discharge of the filament-forming material through these orifices, will follow sequentially the order I, Ia and Ib, IIa and IIb, IIIa, IIIb, etc., as indicated in Fig. 11.

In the embodiment shown in Figs. 13, 14 and 15, the materials to be extruded lie in strata in the composite, and as fed through a conduit 28 leading to the extrusion orifices these strata may lie transversely of the conduit 28 as shown in Fig. 13.

Figs. 13, 14 and 15 differ from Fig. 10 in showing horizontally disposed strata of material and an inclined bottom surface of the spinneret. These figures also illustrate how arrival of a stratum of material at the orifices in relatively inclined relation thereto, and progressive covering and uncovering of the orifices by such stratum, can be determined by differences in resistance to flow through the several orifices.

The bottom of the conduit 28 is provided with many extrusion orifices of which typical ones are shown at 30, 31, 32, 33, these orifices having progressively greater resistance to flow of the material, beginning for instance at one side of the conduit. This effect is shown as secured by the formation of the inside of the bottom of conduit 28 with an inclination as shown, with the outside of the bottom at right angles to the conduit so that the orifices represented by 30, 31, 32 and 33 are progressively of longer length. Such progressively greater resistance to flow can also be secured by forming these conduits of progressively smaller diameter, or by a combination of smaller diameter and longer length.

Due to the viscosity of the materials within the conduit, that portion of the one material 35 which arrives nearest to the most easily traveled orifice will extrude at a greater rate than that portion of the material 35 that arrives nearest to the more difficultly traversed orifices, with the result that the originally horizontally-transverse stratum of the other material 36 will become inclined, and its right side as viewed in Fig. 14 will reach and cover the more easily traversed orifices, for instance those indicated at 30 and 31, while other orifices such as those indicated at 32 and 33 are still covered by the material 35. The material 36 will then sequentially cover the other orifices and sequentially uncover those orifices which it first covered, progressing from the condition diagrammatically shown in Fig. 14 to that diagrammatically shown at Fig. 15, the material 35 sequentially uncovering the more difficultly traversed orifices such as 32 and 33 until these are covered by the material 36 as shown in Fig. 15. Simultaneously with the sequential uncovering of orifices by the material 36 the next succeeding body of material 35 progressively covers the orifices, beginning with the most easily traversed orifices.

In this manner the initially complete strata of the materials, occupying the entire cross section of conduit 28 are converted into incomplete strata, each of which expose a portion of one group of orifices to the other material. As in the other embodiments of the invention each material at any given moment passes through at least one and preferably several of the orifices, so that the desired longitudinal staggering of the extruded pieces is secured. In Figs. 13 to 15, the material 35 may be the filament-forming material, and the material 36 may be an inert non-coagulable material, these two materials for example comprising respectively a heavy casein solution, and a heavy mineral oil thickened with metallic soap.

As will be apparent from the above, each material of the composite may be a filament-forming material, or one material may be a filament-forming material and the other material may be a non-filament-forming or inert material capable of separation from the filament-forming material after the extrusion. In either case, the extruded sliver is subjected to hardening appropriate to its filament-forming material, and if a non-filament-forming or inert material is included in the composite, such material is separated from the extruded sliver, for example, as described in my said Patent No. 2,399,191.

While, as will be apparent from the above, the invention is of particular utility in avoiding any need for distributing one of the materials uniformly in another material, many of the advantages of the invention can be secured when one of the materials of the composite has particles of the other material distributed therein. In this case a further interrupting action in the extrusion orifices can be secured in addition to that which would be effected by the sequential opening and closing of the orifices by a homogeneous material of the composite.

In each of the illustrated forms of the invention fibers emerging from the nozzle are preferably subjected to suitable hardening treatment appropriate to the filament-forming material or methods employed, and to separation therefrom of any non-filament-forming material, the fibers meanwhile being maintained in the form of a sliver. My said Patent No. 2,399,191 may be referred to for examples of such steps in the direct production of a sliver of staple length filaments from a nozzle. However, certain of the advantages of the invention are secured if the extruded fibers, suitably hardened, are not immediately formed into a sliver but are allowed to accumulate as a mass of tow for appropriate subsequent use, as for instance for use in mixing with other textile fibers and subsequent formation into slivers.

I claim:

1. Method of forming staple-length fibers by extrusion of flowable materials adapted to interrupt passage of each other through extrusion orifices arranged in a group, at least one of said materials being a filament-forming material immiscible with another of said materials to the extent of maintaining a boundary surface therewith during extrusion, the method comprising causing such boundary surface to approach such group of orifices in relatively inclined relation thereto so that bodies of said one material and of said other material cover the orifices of said group sequentially.

2. Method of forming staple-length fibers by extrusion of flowable materials adapted to interrupt passage of each other through extrusion orifices arranged in a group, at least one of said materials being a filament-forming material immiscible with another of said materials to the extent of maintaining a boundary surface therewith during extrusion, the method comprising causing one of said materials in a substantially homogeneous state to present itself to the group of orifices with its said boundary surface relatively inclined to the group of orifice entrances so as to uncover orifices of the group, in sequence, to the other said material.

3. Method of forming staple-length fibers by extrusion of flowable materials adapted to interrupt passage of each other through extrusion orifices arranged in a group, at least one of said materials being a filament-forming material immiscible with another of said materials to the extent of maintaining a boundary surface therewith during extrusion, the method comprising causing one of said materials in a substantially homogeneous state to present itself to the group of orifices with its said boundary surface relatively inclined to the group of orifice entrances so as to cover orifices of the group, in sequence, against entry of the other said material.

4. Method of forming staple-length fibers by extrusion of flowable materials adapted to interrupt passage of each other through extrusion orifices arranged in a group, at least one of said materials being a filament-forming material immiscible with another of said materials to the extent of maintaining a boundary surface therewith during extrusion, the method comprising causing one of said materials to present itself to the group of orifices in the form of a body having a spiral boundary surface with respect to the other said material.

5. Method of forming staple-length fibers by extrusion of flowable materials adapted to interrupt passage of each other through extrusion orifices arranged in a group, at least one of said materials being a filament-forming material immiscible with another of said materials to the extent of maintaining a boundary surface therewith during extrusion, the method comprising causing a body of one of said materials to present itself to a generally circularly disposed group of orifices, and further causing said body to present a generally spiral boundary surface to the other of said materials.

6. Method of forming staple-length fibers by extrusion of flowable materials adapted to interrupt passage of each other through extrusion orifices arranged in a group, at least one of said materials being a filament-forming material immiscible with another of said materials to the extent of maintaining a boundary surface therewith during extrusion, the method comprising guiding a body of one of said materials in a generally spiral path at its approach to a generally circularly disposed group of orifices while causing said body to present a generally spiral boundary surface to the other of said materials.

7. Method of forming staple-length fibers by extrusion of flowable materials adapted to interrupt passage of each other through extrusion orifices arranged in a group, at least one of said materials being a filament-forming material immiscible with another of said materials to the extent of maintaining a boundary surface therewith during extrusion, the method comprising preparing the materials in a plastic mass in which one of said materials is disposed in a generally spiral configuration presenting a generally spiral boundary surface to the other said material, and the method further comprising applying the mass under pressure to a group of orifices adapted periodically to intercept the spirally disposed material.

8. Method of forming staple-length fibers by extrusion of flowable materials adapted to interrupt passage of each other through extrusion orifices arranged in a group, at least one of said materials being a filament-forming material immiscible with another of said materials to the extent of maintaining a boundary surface therewith during extrusion, the method comprising presenting successive strata of one of said materials, demarked from strata of another of said materials by boundary surfaces, to the group of orifices with such boundary surfaces in inclined relation thereto so as to uncover and cover orifices of the group in sequence.

9. The method claimed in claim 1 in which said strata of said materials, so demarked by said boundary surfaces, are delivered to said group of orifices, orifices of said group having different resistances to flow.

10. The method claimed in claim 1 in which said strata of said materials, so demarked by said boundary surfaces, are delivered to said group of orifices, orifices of said group having different lengths.

11. The method claimed in claim 1 in which the materials are prepared in a mass in which one of said materials lies in strata, so demarked by such boundary surfaces from strata of the other material, and such mass is presented under pressure to said group of orifices, orifices of said group having substantially different resistances to flow so as to convert complete strata of one material into incomplete strata which expose a portion of the group of orifices to the other material.

References Cited in the file of this patent

UNITED STATES PATENTS

| | | |
|---|---|---|
| 1,856,071 | Ferrand | May 3, 1932 |
| 2,336,159 | Bent | Dec. 7, 1943 |
| 2,347,525 | Thinius | Apr. 25, 1944 |
| 2,399,191 | Abbott | Apr. 30, 1946 |
| 2,473,499 | Abbott | June 21, 1949 |

FOREIGN PATENTS

| | | |
|---|---|---|
| 619,841 | France | Aug. 5, 1926 |